June 10, 1969 G. F. THIEMAN 3,448,892
FUEL TANK FILLER TUBE
Filed Aug. 24, 1966
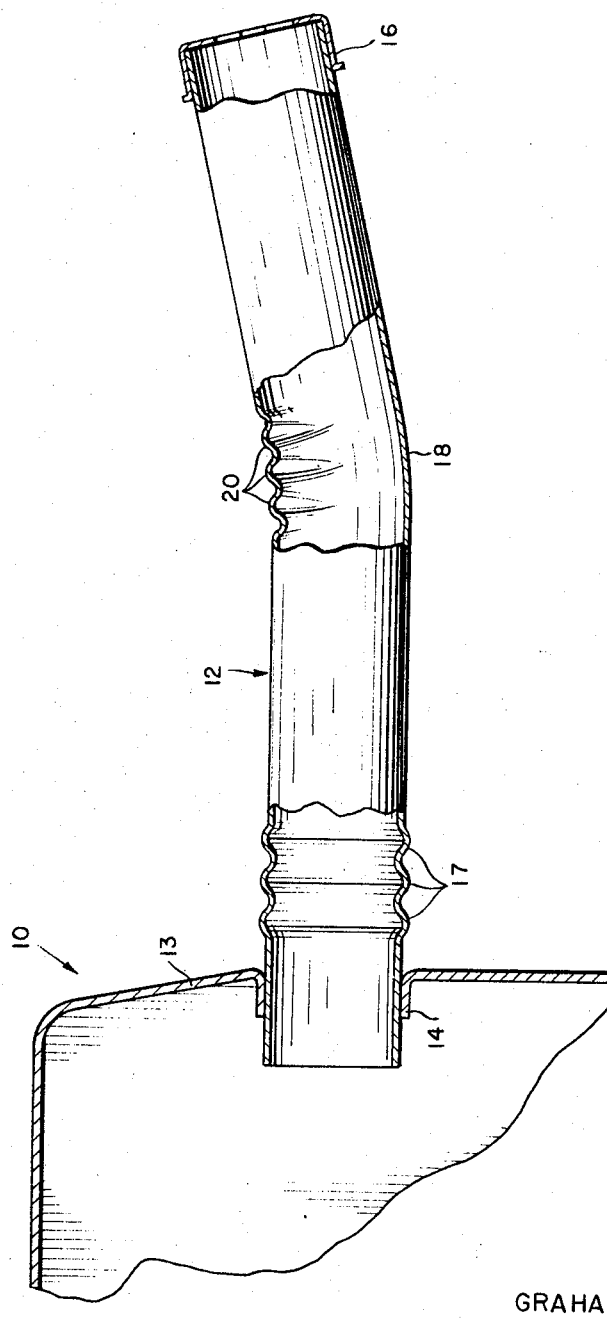
INVENTOR.
GRAHAM F. THIEMAN
BY
ATTORNEYS

United States Patent Office 3,448,892
Patented June 10, 1969

3,448,892
FUEL TANK FILLER TUBE
Graham F. Thieman, Columbus, Ind., assignor to Arvin Industries, Inc., Columbus, Ind., a corporation of Indiana
Filed Aug. 24, 1966, Ser. No. 574,633
Int. Cl. B67d 3/00; B67c 3/00
U.S. Cl. 220—86          1 Claim

ABSTRACT OF THE DISCLOSURE

A filler tube in combination with an automotive vehicle fuel tank in which said tube is an elongated rigid unitary tube having a discharge end connected to said tank and a fill end. The tube is bent along its length and is provided with a first set of corrugations along the inside curve of said bend and a second set of corrugations outside the extent of said bend. The sets of corrugations are transverse to the tube axis and reduce the columnar strength of said tube to permit it to bend easily upon impact.

---

This invention relates to a fuel tank filler tube, and more particularly to a crushable or collapsible filler tube for a fuel tank for an automotive vehicle.

In the manufacture of automotive vehicles the fuel tank is commonly mounted adjacent the rear of the vehicle and the filler tube extends rearwardly from said tank at a shallow upward angle to dispose its fill opening in a position of access at the rear of the vehicle. Thus, the filler tube is in a position such that when it is subjected to an impact force, as in a rear end accident, it will tend to rupture or break or it may also tend to cause a rupture or break in the fuel tank or in the connection between the tube and fuel tank. Any such rupture can result in the possible spillage of fuel with its attendant fire hazard.

It is therefore an object of this invention to provide an improved filler tube for a fuel tank which will overcome the difficulties and disadvantages described above. More specifically, it is an object of the invention to provide a filler tube for fuel tanks which will have a propensity toward collapse, as opposed to rupture, when subjected to an impact force.

In accordance with the preferred form of the invention, there is provided a filler tube rigidly connected to the fuel tank of an automotive vehicle and extending rearwardly therefrom to dispose its closable fill end in a position of access. The tube has a plurality of corrugations intermediate its fill end and its connection to the fuel tank to reduce its columnar strength sufficiently such that it will maintain its shape and configuration under normal operating conditions but will be readily collapsed when subjected to an impact force.

Other objects and features of the invention will become apparent from the more detailed description which follows and from the accompanying drawing, in which:

The single figure showing is a fragmentary sectional view of a fuel tank and filler tube assembly embodying the invention.

As shown in the drawing, the interior of an automotive vehicle fuel tank 10 is connected to a filler tube 12, adjacent the discharge end thereof, through an opening in the tank side wall 13. Conveniently, an annular flange 14 extends around the wall opening and is fixedly connected to the tube 12. The tube projects outwardly from the tank to dispose its fill end in a position of ready access on the vehicle, usually at the rear of said vehicle. As shown, a conventional cup-receiving collar 16 is fixedly mounted on the fill end of the tube 12.

The tube 12 is formed from a rigid material such as steel tubing. To reduce its columnar strength in order to cause it to crush or collapse, as opposed to rupturing, when subjected to an impact force, a plurality of corrugations 17 are formed in the tube between its connection to the fuel tank 10 and its fill end defined by the collar 16. Any number of such corrugations may be formed in the tube without destroying its self-supporting property, but as the number of such corrugations is increased, the propensity of the tube toward linear and/or angular collapse when subjcted to an impact force is increased. While the corrugations 17 are illustrated as composing a discontinuous series of axially spaced rings, they can also have a continuous spiral configuration.

In the illustrated embodiment, the tube 12 is also bent, at 18, a common expedient in conventional filler tubes in order for them to clear various components on the vehicle. To increase the propensity of my improved filler tube toward angular collapse, a series of generally wedge-shaped corrugations 20 are also formed in the tube along the inside of curve bend 18.

I claim:
1. The combination of an automotive vehicle fuel tank, an elongated rigid unitary tube having a fill end and a discharge end connected to said fuel tank, said tube having a bend between its fill end and its discharge end, a first set of corrugations integrally formed in said tube along the inside curve only of said bend, and a second set of corrugations integrally formed in said tube outside the extent of said bend and extending circumferentially around said tube, said first and second sets of corrugations being transverse to the tube axis and extending axially therealong for reducing the columnar strength of said tube without destroying its self-supporting property.

References Cited

UNITED STATES PATENTS

| | | | |
|---|---|---|---|
| 3,167,974 | 2/1965 | Wilfert | 74—492 X |
| 581,343 | 4/1897 | Frank | 138—121 |
| 1,813,039 | 7/1931 | Escol | 138—121 X |
| 1,813,554 | 7/1931 | Wickline | 220—86 |
| 2,138,104 | 11/1938 | Kellogg | 220—86 |
| 2,157,564 | 5/1939 | Peuthert | 138—121 |
| 2,563,578 | 8/1951 | Canoee | 138—121 X |
| 2,870,792 | 1/1959 | Penrose | 138—121 |
| 3,318,335 | 5/1967 | Heller | 138—121 |
| 3,323,544 | 6/1967 | Francis | 137—587 |

RAPHAEL H. SCHWARTZ, *Primary Examiner.*